Jan. 26, 1954  I. A. ASP ET AL  2,667,081
OPERATING DEVICE FOR CHANGE-SPEED GEARINGS OF BICYCLES
Filed Nov. 20, 1950
3 Sheets-Sheet 1
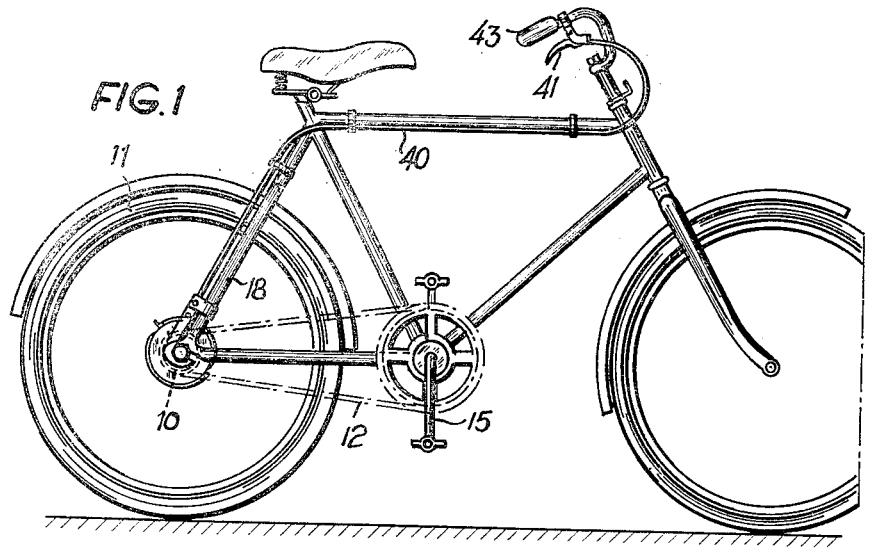
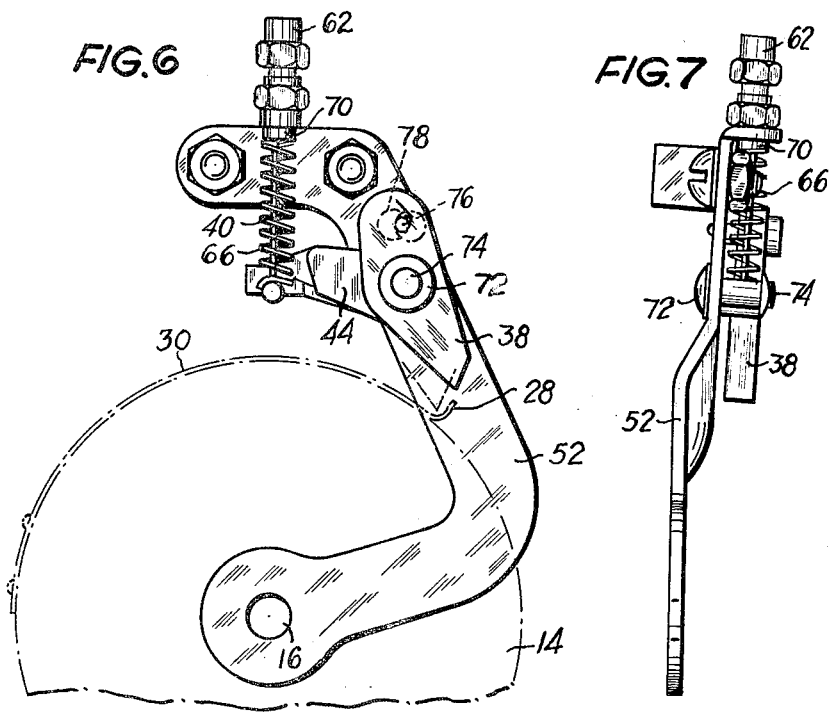
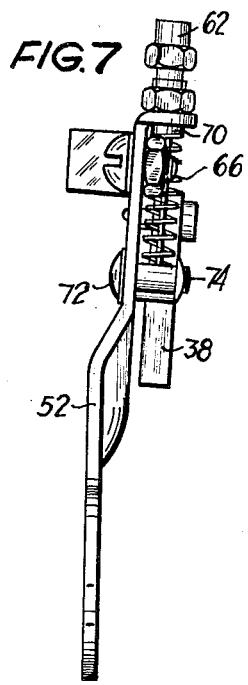
Inventors
Ivar A. Asp +
Olof G. Berg
By Young, Emery + Thompson
Attorneys Jan. 26, 1954
I. A. ASP ET AL
2,667,081
OPERATING DEVICE FOR CHANGE-SPEED GEARINGS OF BICYCLES
Filed Nov. 20, 1950
3 Sheets—Sheet 2
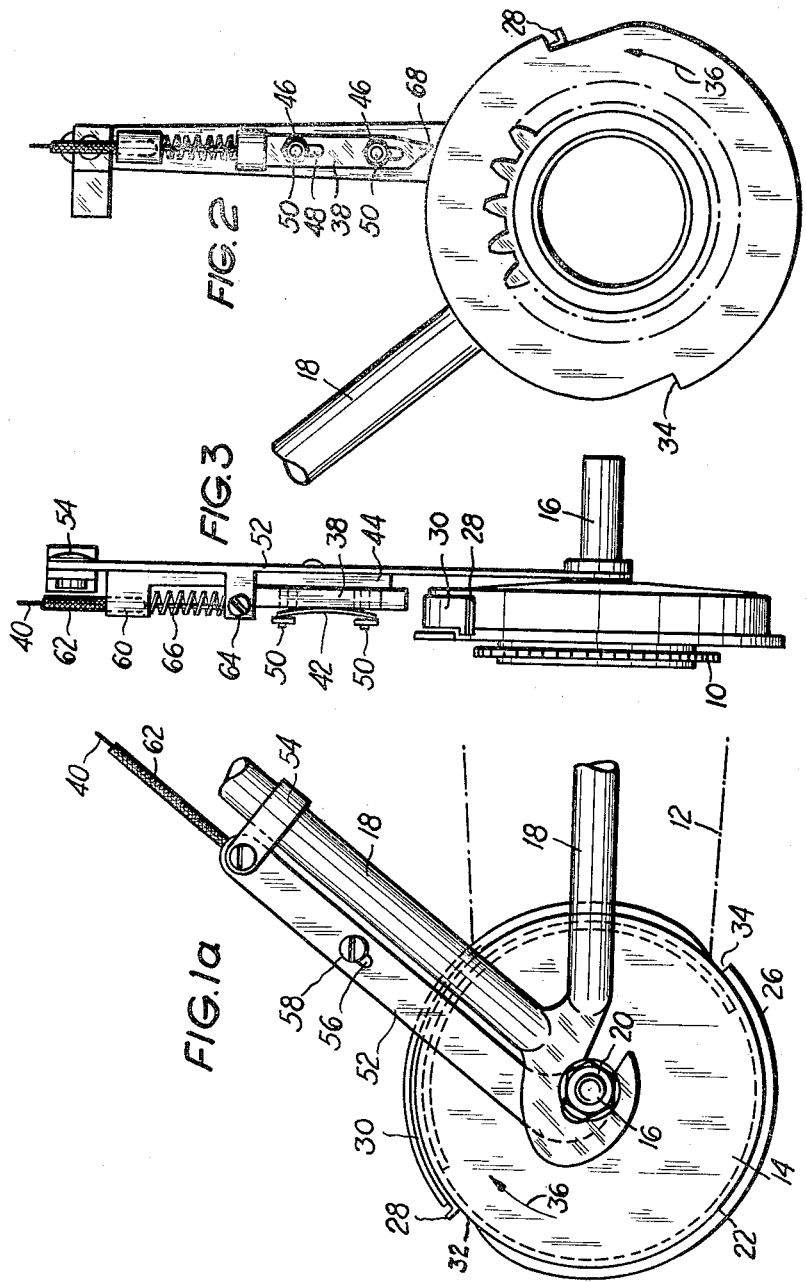
Inventors
Ivar A. Asp +
Olof G. Berg
By Young, Emery & Thompson
Attorneys

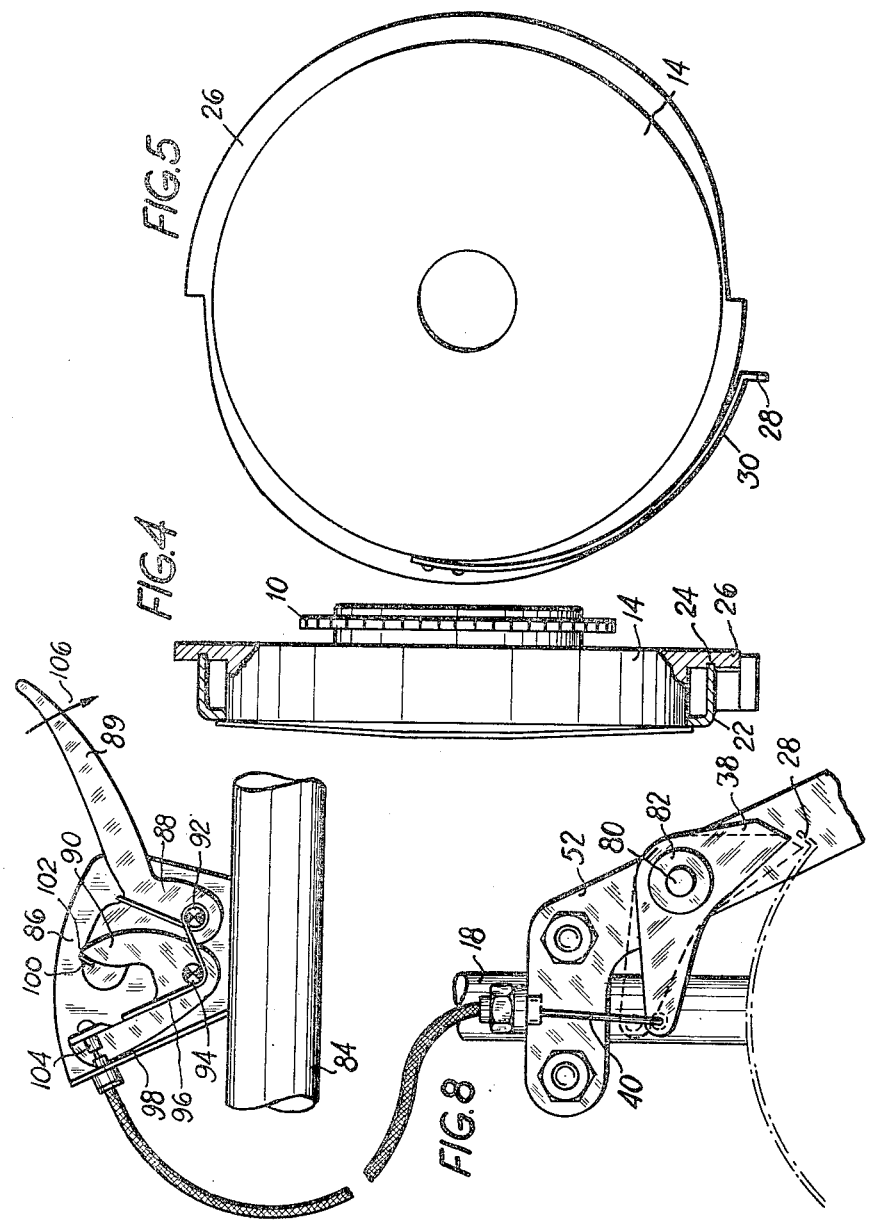

Patented Jan. 26, 1954

2,667,081

UNITED STATES PATENT OFFICE 2,667,081

OPERATING DEVICE FOR CHANGE-SPEED GEARINGS OF BICYCLES

Ivar Alvar Asp, Hagersten, and Olof Gunnar Berg, Huskvarna, Sweden, assignors to Husqvarna Vapenfabriks Aktiebolag, Huskvarna, Sweden, a corporation of Sweden Application November 20, 1950, Serial No. 196,624

7 Claims. (Cl. 74—473)

The present invention refers to bicycle change-speed gearings provided with a rotary driving member and an operating member adapted to be entrained during the rotation of the driving member while being movable relatively to the latter for the shifting of the gearing from one speed to another and in so moving has to overcome friction. The invention has for its object to provide a simple and safely acting contrivance for the operation of bicycle gearings of the type in consideration.

The substantially distinguishing feature of the invention resides, above all, in the provision on the driving member of a restoring surface or the like for the restoring of a stop arm arranged on the bicycle frame and adapted by manual actuation to be adjusted into a position for the displacement of the operating member and the driving member relatively to each other, said returning surface being adapted directly or indirectly to actuate the stop arm at the rotation of the driving member. By this arrangement an automatic restoration may be obtained by the member that caused the shifting of the gearing immediately upon the effectuation of a changing operation. Thus, no risk of forgetting this return movement or restoration is incurred.

The operating member may consist of a ring rotatably arranged on the driving member and provided with an adjustable projection. By a construction of the operating member in this way the further advantage is obtained that the movement of the operating member and the driving member required for the shifting operation can become very simple, inasmuch as the same only has to comprise a turning movement of the driving member relatively to the ring, which may be obtained by the stop arm cooperating with the projection on the ring so as to stop the latter at the rotation of the driving member. The return movement may be obtained by the utilization of a similar movement of the driving member and the ring relatively to each other.

Some embodiments of the invention as applied to a gearing mounted at the hub of the rear wheel of the bicycle will be described by way of example with reference to the accompanying drawings, in which:

Fig. 1 is an elevation of a bicycle equipped with a gearing having an operating device according to the invention.

Fig. 1a is a vertical elevation on an enlarged scale of a bicycle gearing provided with an operating device according to the invention as well as of the adjacent parts of a bicycle frame on which the device is mounted.

Fig. 2 is a vertical elevation of the same bicycle gearing as Fig. 1 but viewed from the inside, that is to say, from the middle of the wheel hub on which the gearing is arranged.

Fig. 3 is a rear elevation corresponding to Figs. 1 and 2.

Fig. 4 is a front elevation and part sectional view of the bicycle gearing per se.

Fig. 5 is a side elevation corresponding to Fig. 4.

Figs. 6 and 7 are two vertical elevations showing a modified embodiment of the operating device at right angles to each other.

Fig. 8 is an elevation illustrating a further modification by way of diagrammatic representation.

In the construction shown, the driving member of the gearing consists of a sprocket wheel 10 pertaining to that chain transmission with a chain 12 by means of which the rear wheel 11 of the bicycle is used to be driven from the crank mechanism. The sprocket wheel 10 is rigidly arranged on a casing 14 enclosing the various gear steps of the gearing, and is rotatable about the hub shaft 16, which is retained at the bicycle frame 18 in the ordinary manner by means of a nut 20. When the sprocket wheel 10 rotates, the casing 14 is driven about the shaft 16, the movement being transferred directly or over different step-down wheels to the wheel hub. The shifting from one gear speed to another is effected by means of an operating member 22 arranged on the gear casing 14 and movable relatively to the driving sprocket wheel. In the construction shown, the operating member 22 takes the form of a ring, which is rotatably mounted with an edge in a groove 24 in the side surface of a flange 26 on the casing 14 (Fig. 4). However, the friction between the ring and the casing is sufficient to cause the ring to be entrained by the casing at the rotation of the latter, if it is not checked.

Provided on the ring 22 is a projection 28 formed by the outwardly bent end of a leaf spring 30, which is secured with its other end to the ring 22 and extends for a distance along the outer peripheral portion of the ring. It is thus possible for the projection 28 to be adjusted by being moved outwardly from the ring against the influence of the spring. It projects outwardly in a lateral direction over the flange 26, the peripheral surface of which forms a guiding means for the projection at a turning movement of the casing 14 and the ring 22 relatively to each other. The flange 26 is provided with two diametrically opposed recesses 32, 34, the bottom of which extends in the one direction— that is to say, in a direction opposed to the direction of the rotation of the casing (the arrow 36 in Figs. 1a and 2) to begin with substantially tangentially with respect to the casing in order then to merge into the circular peripheral portion of the flange 26 in a gently curved restoration or cam surface. At the relative turning movement of the ring 22 and the casing 14, the projection 28 slides resiliently on the peripheral portion of the flange 26 and may alternately descend into and engage one or the other of the recesses 32, 34, corresponding to the switching-in of either one of two gear speeds. If the gearing comprises more than two steps or speeds, more recesses will be required, and the number of recesses generally equals the number of speeds or steps in the gearing.

When the gearing is in operation, the casing 14 rotates through the driving action of the sprocket rim 10, which is in turn actuated by the chain 12. The ring 22 is entrained in the rotary movement, and to bring about the relative turning movement of the casing and the ring required for the shifting of the gearing, it is only necessary that the ring be stopped for a certain portion of a revolution of the casing, or, in the example shown, for half a revolution, so that the projection 28 can be moved from the one recess 32 to the other 34. For this shifting operation there is provided a stop arm 38 on the frame 18 of the bicycle, said stop arm being adapted by manual actuation to be adjusted into a position where it is situated in the path of movement of the projection 28 so as to be capable of checking and retaining the projection and thus the ring 22.

The stop arm 38 is for the purpose of its operation connected through a friction coupling of a construction to be set forth in the following and by means of a Bowden cable 40 or the like to an operating handle 41 adjustable relatively to the bicycle frame, said handle 41 being preferably arranged on the handle bar 43 of the bicycle. In the construction according to Figs. 1-5, the friction coupling is formed by the stop arm 38 being pressed by means of a spring 42 against an operating arm 44 provided with bolts 46 extending through elongated apertures 48 in the stop arm 38. The spring 42, which takes the form of a curved leaf spring, is clamped between the stop arm and nuts 50 arranged on the bolts 46. The operating arm 44 is in turn carried by a holder bar 52, one end of which is secured by means of a clamp 54 to a frame tube of the bicycle while being clamped fast with the other end thereof onto the frame shaft 16. Provided in the holder bar 52 is an elongated aperture 56 having a screw 58 extending therethrough, said screw 58 being secured in the operating arm 44. The operating arm 44 may thus be displaced for a limited distance in its longitudinal direction on the holder bar 52, thus entraining the stop arm 38. The operating arm 44 is provided at the top with an abutment 60, which constitutes an attachment for the casing or sleeve 62 of the Bowden cable. The cable wire 40 proper is secured in a similar abutment 64 on the holder bar 52. A helical spring 66 is inserted between the abutments 60 and 64, in a manner such as to tend to press the abutment 60 and thus the operating arm 44 in an upward direction. Hereby the stop arm 38 is kept bearing with its upper end against the lower side of the abutment 64. This corresponds to the inoperative position of the operating device. In this position, the lower end of the stop arm 38, which is formed into a point 68, is situated outside the circumference of the flange 26 by an amount such that the projection 28 clears the same at the rotation of the casing 14 and the ring 22.

If the operating handle 41 arranged on the handle bar of the bicycle is actuated, the casing 62 of the Bowden cable 40 will be displaced downwardly, thus entraining the arm 44 and the stop arm 38 retained thereon through the friction coupling. The arm 44 is guided thereat by the screw 58, which slides in the aperture 56. The point 68 of the stop arm 38 thus enters the path of movement of the projection 28 resting in the recess 32, said projection striking against the point to become checked by the stop arm. It is retained, until it snaps down into the recess 34 through the action of the spring 30. When the projection 28 leaves the recess 32, it will first slide on the cam surface forming the bottom of said recess in order then to ride up on the peripheral portion of the flange 26. The stop arm 38, which bears on the spring 30 adjacent to the projection, will thus be pressed outwardly against the effect of the friction against the arm 44. This is possible, in spite of the arm 44 being kept depressed, owing to the fact that the stop arm is displaceable on the operating arm 44. When the projection falls down into the recess 34, its contact with the point of the stop arm 68 will be interrupted, so that the ring 22 can henceforth rotate freely together with the casing 14 with the new gear step thrown into engagement. When the handle on the handle bar is then released, the operating arm 44 is pressed upwardly by the spring 66, the stop arm being thus returned into the initial position relatively to the arm 44 by the fact that its upper end strikes against the abutment 64.

The embodiment shown in Figs. 6 and 7 is analogous to the embodiment now described and differs from the same substantially only in that the stop arm 38 and the operating arm 44 are rotatably arranged instead of being rectilinearly displaceable. Furthermore, the casing 62 of the Bowden cable is secured here to the holder bar 52, while the wire 40 proper is connected to the operating arm 44. The helical spring 66, which is arranged on the wire 40 between the arm 44 and a support 70 on the holder bar 52, presses the arm 44 downwardly. The arms 44 and 38 are rotatably arranged on a common bolt 72 secured to the holder bar 52, and are pressed against each other on the bolt by means of a spring washer 74 arranged thereon corresponding to the spring 42 in Fig. 3. Hereby the friction coupling is established between the arms. Arranged on the holder bar 52 is a pin 76 projecting into an aperture 78 provided in the stop arm 38, said aperture having a diameter considerably greater than that of the pin 76. Hereby the capability of rotation of the stop arm on the bolt 72 is restricted.

When the cable 40 is actuated in the embodiment shown in Figs. 6 and 7, the arm 44 will be swung upwardly against the influence of the spring 66, which is thus compressed. The stop arm 38 is entrained owing to the friction coupling as far as this will be permitted by the pin 76. The point of the stop arm is thus swung into the position indicated by dash lines in Fig. 6, where it may stop and retain the projection 28 on the spring 30, shifting being thus obtained in the manner described at length with reference to the first embodiment.

In the embodiment according to Fig. 8, the stop arm 38 is also pivotally arranged, that is to say on a bolt 80, which is situated on the holder bar 52. However, the operating arm 44 is lacking here, and the stop arm 38 is pressed by the spring washer 82 on the bolt directly against the holder bar 52 secured to the frame tube 18. Furthermore, the stop arm is connected directly to the wire 40 of the Bowden cable, the other end of which at the handle bar 84 of the bicycle is connected with a specially devised operating mechanism.

The operating mechanism consists of a housing 86 and two levers attached to the steering rod 84, said levers being preferably constituted by bell crank levers 88, 90, which are mounted in the housing 86 on separate pins 92, 94, so as to have separate pivot centers. The lever 88 is formed with a handle 89. The mechanism also comprises a spring 96, which is connected with its one end to the arm 88 and with its other end to the arm 90 while being wound around the pins 92, 94 in such manner as to tend to turn the levers 88, 90 in opposite directions. The lever 90 bears against a flange 98 on the housing 86, and the lever 88 is retained in the position shown against the tension of the spring by means of a boss 100 cooperating with a checking surface 102 on the lever 90. Furthermore, the lever 90 is connected with the wire 40 through a nipple 104.

The mode of operation of the contrivance shown in Fig. 8 is as follows:

When the lever 88 is swung in the direction indicated by the arrow 106, the lever 90 is carried along in the movement by the boss 100. On account of the eccentrical mounting of the levers the boss 100 will then slide upwardly along the checking surface 102. When the lever 88 has been swung through a certain angle, the boss slides past the upper edge of the checking surface 102. The lever 90 will thus become released so as to swing back into the initial position. The nipple 104, however, remains on account of the friction of the wire 40 against the cable casing in the position it had when the lever 90 changed its direction of movement. When the lever 88 is then released, it will be returned by the spring 96 into its initial position. The boss 100 has an oblique lateral surface facing the side of the lever 90, and this lever 90 is mounted on its pin 94 in such manner as to be movable to some extent in a lateral direction. The lever 90 is thus pressed away somewhat laterally by the boss 100, when the lever 88 swings back on having been released, so that the boss can move past the lever 90 in order again to take its initial position.

The levers 88, 90 thus form a coupling, which is connected through the wire 40 with the stop arm 38. Through this coupling the stop arm 38 will be entrained momentarily at the beginning of the depression of the handle 89 to be released toward the end of this movement. The stop arm 38 will thus be swung only for a momentary period with its point down into the path of movement of the projection 28, that is to say, into the position shown by dash lines in Fig. 8. The momentary period is sufficient to permit the performance of the previously described rotary movement of the operating ring and the rotating casing of the gearing relatively to each other and to cause shifting from one speed to another in consequence thereto.

The construction shown in Fig. 8 brings the advantage, above all, that only a momentary changing impulse is required here, for which reason the handle need not be retained, until the cycle of changing has been completed. Furthermore, only a single stop arm is needed in the gearing, all springs being omitted.

The invention is not limited to the embodiments shown, a plurality of modifications of the same being possible within the scope of the invention. Instead of causing the stop arm to be returned indirectly through the intermediary of the spring 30 with the projection 28, it may be moved for the return movement in direct engagement with the peripheral portion of the flange 26, or with some other returning member. In place of making the projection 28 as a portion of a leaf spring, it may be arranged as a separate member, for instance as a spring-actuated locking tooth recessed into the peripheral surface of the driving member.

What we claim is:

1. An operating device for bicycle change speed gearings comprising in combination with a rotary driving member of the change speed gearing, an operating member adapted to be entrained by said rotary driving member and mounted movably thereon to enable motion thereof relatively to the driving member against friction for shifting from one speed to another, and a manually operable stop to be mounted on the frame of the bicycle and being displaceable from a releasing position to a stopping position for said motion of the operating member and the driving member relatively to one another, the driving member being formed with a restoring surface for restoring the stop to the releasing position after a change of the speed, a part of the stop in its stopping position being located in the path of motion of said restoring surface.

2. An operating device for bicycle change speed gearings comprising in combination with a rotary driving member, an operating ring mounted on the driving member, to be entrained thereby during its rotation but being movable on said driving member to enable relative rotation between the ring and said member against friction for shifting from one speed to another, an adjustable projection mounted on said ring, and a manually operable stop to be mounted on the frame of the bicycle, said stop being displaceable from a releasing position to a stopping position in the path of said projection to stop said ring and to cause said relative rotation between the ring and the driving member, a restoring cam being formed on the driving member to restore the stop to its releasing position after a change of speed.

3. Device as claimed in claim 2 and further comprising an adjustable operating arm, a Bowden wire connected with said operating arm for manual operation thereof and means forming a friction clutch between said stop and said operating arm, whereby the stop may be adjusted by said operating arm to its stopping position and restored to its releasing position while overcoming the friction of said friction clutch means.

4. Operating means to be mounted on a bicycle frame for temporarily stopping a rotary operating ring of a bicycle change speed gearing for initiating a change of gear, comprising an adjustable operating arm, a stop adjustable between a releasing position and a stopping position, a flexible motion transmitting cable connected with said arm, and friction clutch means between the operating arm and the stop to cause entrainment of the stop on adjustment of the operating arm and to allow restoring of the stop while overcoming the friction of the friction clutch means.

5. Operating means as claimed in claim 4, in which the stop is formed as an arm pivoted to a stationary bolt forming a pivot also for the operating arm, the friction clutch means comprising a spring washer mounted on the same bolt and adapted to press opposite sides of the stop arm and the operating arm against one another.

6. An operating device for bicycle change speed gearings comprising in combination with a rotary driving member, an operating ring mounted on the driving member to be entrained thereby during its rotation but being movable on said driving member to enable relative rotation between the ring and said member against friction for shifting from one speed to another, spring means mounted on the driving member and comprising a projection, and a manually operable stop to be mounted on the frame of the bicycle, said stop being displaceable from a releasing position to a stopping position in the path of said projection to stop said ring and to cause said relative rotation between the ring and the driving member, said driving member having a peripheral flange formed with recesses and engaged by said projection, whereby the projection may take different positions relatively to the stop, as the projection engages the recesses and the remainder of the flange periphery.

7. An operating device as claimed in claim 6 and further characterized by the fact that the spring means comprises a leaf spring having one end secured to the operating ring and its other end slidably engaging the periphery of the flange of the driving member, the projection being located at the latter end.

IVAR ALVAR ASP.
OLOF GUNNAR BERG.

References Cited in the file of this patent

UNITED STATES PATENTS

| Number | Name | Date |
|---|---|---|
| 524,443 | Kortright | Aug. 14, 1894 |
| 2,201,304 | Sekella | May 21, 1940 |

FOREIGN PATENTS

| Number | Country | Date |
|---|---|---|
| 23,647 | Great Britain | of 1901 |
| 625,114 | Germany | Dec. 7, 1933 |